United States Patent [19]

Sentoku

[11] 4,249,553
[45] Feb. 10, 1981

[54] COIN GUIDING DEVICE FOR USE IN A COIN PROCESSING MACHINE

[75] Inventor: Hideshi Sentoku, Tokyo, Japan

[73] Assignee: Laurel Bank Machine Co., Ltd., Japan

[21] Appl. No.: 18,270

[22] Filed: Mar. 7, 1979

[30] Foreign Application Priority Data

Mar. 24, 1978 [JP] Japan .............................. 53-37748197

[51] Int. Cl.³ .............................................. G07D 9/06
[52] U.S. Cl. .................................................. 133/1 A
[58] Field of Search ............. 133/8 R, 8 A, 8 D, 4 R, 133/1 A; 53/254

[56] References Cited

U.S. PATENT DOCUMENTS 1,750,578  3/1930  Downey .............................. 133/8 A Primary Examiner—Stanley H. Tollberg
Attorney, Agent, or Firm—Fleit & Jacobson

[57] ABSTRACT

In a coin processing machine, a coin passage defined by a fixed guide and a movable guide is provided to supply the coins to be packaged to an accumulating cylinder. The width of the coin passage is varied in accordance with the diameters of the coins to be packaged by moving the movable guide and the accumulating cylinder is replaced by one adapted for the coins to be packaged. A guiding chute is provided for guiding the coins from the coin passage toward the center of the selected accumulating cylinder. An abutting plate may be provided within the chute guide for preventing the coins from striking the inner surface of the guiding chute.

3 Claims, 3 Drawing Figures

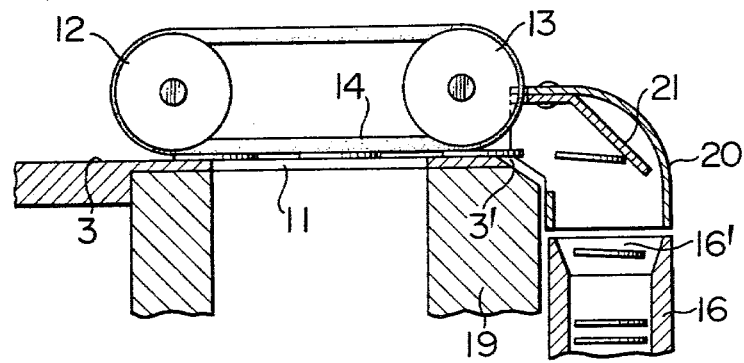
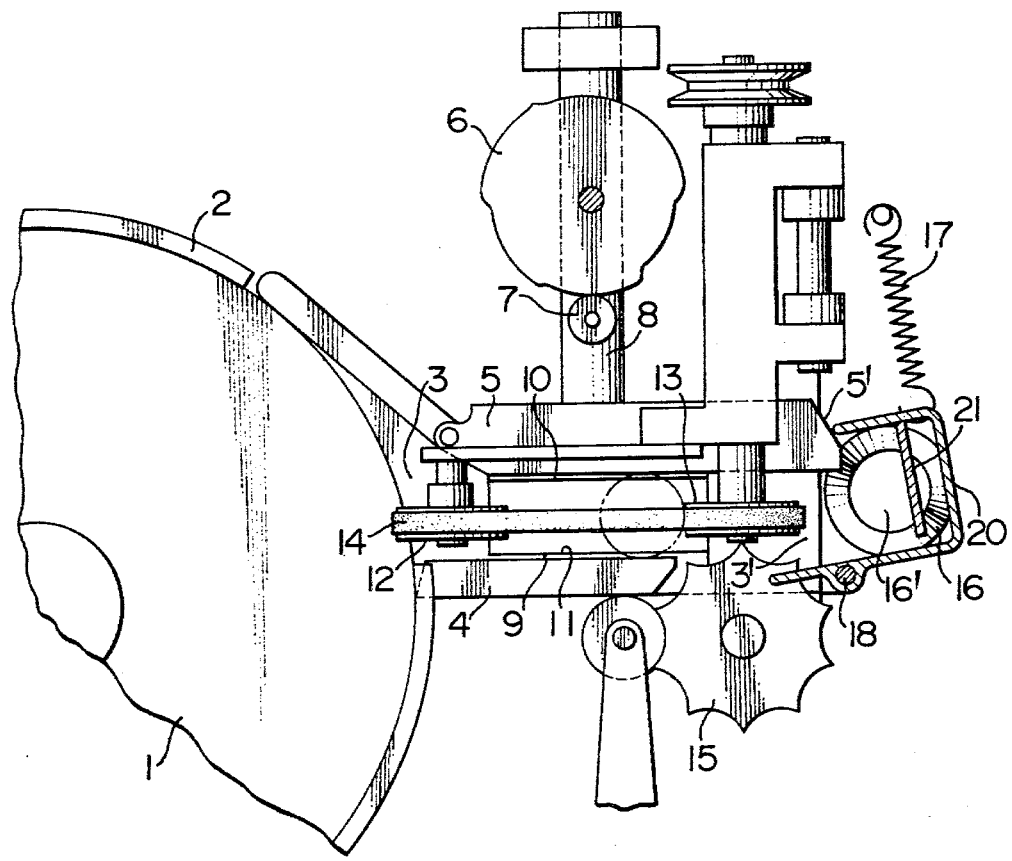

COIN GUIDING DEVICE FOR USE IN A COIN PROCESSING MACHINE

BACKGROUND OF THE INVENTION

This invention relates to a coin packaging machine, particularly to a device for guiding coins from a coin passage into an accumulating cylinder for use in a coin packaging machine of the type in which a predetermined number of coins are accumulated or stacked in an accumulating cylinder and are taken out thereof to be packaged or wrapped in a packaging paper while the opposite ends of the packaging paper are folded or crimped whereby the coins are packaged.

In conventional machines of this type, a coin passage in which coins travel is defined by a fixed guide and a movable guide which is operatively associated with a coin kind setting dial and, therefore, the traveling center of the coins varies in accordance with the diameters or widths of the coins. Accumulating cylinders of various inner diameters are used in accordance with the kinds of the coins and, therefore, the diameters of the coins. The accumulating cylinder for a kind of coins is removably mounted in position, but the position of center of the cylinder cannot be varied to suit the diameter of the coins to be packaged. Consequently, some kinds of coins do not run toward the center of the mounted cylinder and thus are supplied into the cylinder with the center of each coin offset fronm the center of the cylinder. Due to the offset supplement of the coins, the coins may not be regularly stacked in the accumulating cylinder. That is, they may stacked in the accumulating cylinder in an inclined manner and this results in imperfect packaging or makes packaging impossible.

SUMMARY OF THE INVENTION

It is, therefore, an object of the invention to provide a device for guiding coins from a coin passage into an accumulating cylinder for use in a coin packaging machine which eliminates the above-mentioned disadvantages.

It is another object of the invention to provide a device of the above type in which the coins to be packaged are guided toward the center of the selected accumulating cylinder to bring the center of each traveling coin into alignment with the center of the accumulating cylinder and thereby permitting the orderly accumulation of the coins.

In accordance with the present invention, there is provided a coin guiding device for use in a coin processing machine in which a guiding chute is provided between the discharge end of a coin passage and an accumulating cylinder, said guiding chute being operatively associated with a movable guide which forms the coin passage together with a fixed guide and which is moved to vary the width of the coin passage in accordance with the difference in the diameters of coins of different kinds, said guide chute being orientated toward the center of the accumulating cylinder by the movement of the movable guide, whereby the coins of all diameters are guided toward the center of the accumulating cylinder.

BRIEF DESCRIPTION OF THE DRAWINGS

Other objects and advantages of the present invention will become apparent from the following description made with reference to the accompanying drawings, in which:

FIG. 1 is a longitudinally cross-sectional view showing a main portion of an embodiment according to the invention, FIG. 2 is a top plan view of the same embodiment.

DETAILED DESCRIPTION OF THE PREFERRED EMBODIMENT OF THE INVENTION

Figure 3:
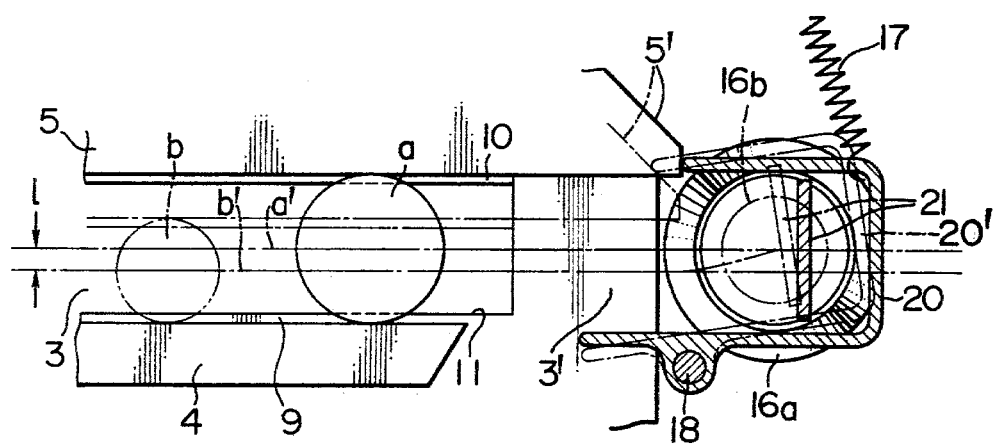
FIG. 3 is an enlarged top plan view of a main portion of the same embodiment.

One embodiment of the present invention will be now described in detail with the reference to the accompanying drawings.

In a coin packaging machine, coins to be packaged are supplied to a disc 1 rotating at a high speed and are disposed along the inner surface of the peripheral wall 2 thereof in a row in contact with each other. The coins are then introduced into a coin passage 3 one by one. The coin passage 3 is defined by a fixed guide 4 and a movable guide 5 disposed opposite thereto which is connected to a slidable bar 8 provided with a roller 7 which is engaged with a cam 6 operatively associated with a coin kind setting dial, not shown. The distance between the fixed guide 4 and the movable guide 5 is varied through the cam 6 by the coin kind setting dial to be compatible with the diameter of the coins to be packaged. Further, an opening 11 is formed between a fixed rail 9 provided on the fixed guide 4 and a movable rail 10 provided on the movable guide for eliminating the coins which are smaller in diameter than the coins selected to be packaged by the coin kind setting dial.

Disposed above the coin passage 3 is an endless belt 14 which is mounted on pulleys 12 and 13 and is driven to be rotated. The belt 14 makes contact with the coins introduced into the coin passage 3 on the upper surface thereof and causes the coins to run in the coin passage 3 in spaced relationship. During the running of the coins, the coins sequentially engage with a star gear 15, each coin contacting one tooth thereof and causing the star gear 15 to rotate so that a count is made.

The coins dischaged from the discharge end 3' of the coin passage 3 drop into an accumulating cylinder 16 which is removably mounted just below the discharge end 3'. Each interchangeable accumulating cylinder 16 is of a slightly greater inner diameter than the diameter of the coins to be packaged and accumulating cylinders of all diameters are mounted in the same position.

For example, as shown best in FIG. 3, the accumulating cylinder 16a for the biggest coin a is mounted so that the center of the accumulating cylinder 16a is in alignment with the traveling center line a' of the biggest coin a. In case of the smallest coin b, the accumulating cylinder 16b for the smallest coin b is mounted in the same position so that the center of the accumulating cylinder 16b is also in alignment with the traveling center line a' of the biggest coin a. However, the travel center line b' of the smallest coin b is different from the traveling center line a' of the biggest coin a and, therefore, when the smallest coin b drops into the accumulating cylinder 16b, it drops in an inclined orientation due to the misalignment between the traveling center line b' of the smallest coin b and the center of the accumulating cylinder 16b and may be stacked in the accumulating cylinder in an irregular condition.

The present invention provides a guiding chute 20 for preventing this problem. The guiding chute 20 is pivotably mounted on one side wall thereof on the frame 19 through a shaft 18 and is engaged at the end of the other side wall thereof with a cam surface 5' formed on the movable guide 5 at one end thereof, the engagement being maintained through the action of a spring 17, so that the guiding chute 20 covers the discharge end 3' and a dropping inlet 16'.

A downwardly inclined abutting plate 21 is provided within the guiding chute 20 for preventing the coins from directly striking on the inner surface of the guiding chute 20 and for preventing the guiding chute 20 from wear. However, the abutting plate 21 need not necessarily be mounted within the guiding chute 20.

In the above construction, in the case of the biggest coin a, the accumulation of the coins is accomplished in good condition since the traveling center line a' of the biggest coin a is in alignment with the center of the accumulating cylinder 16a for the biggest coin a. In the case of the smallest coin b, the distance e exists between the traveling center line b' of the smallest coin b and the center of the accumulating cylinder 16b. However, when the width of the coin passage 3 is varied to be compatible with the smallest coin b by moving the movable guide 5, the movement of the movable guide 5 causes the engaging point of the cam surface 5' and the side wall of the guide chute 20 to be varied. Consequently, the guide chute 20 is rotated by the spring 17 about the shaft 18 to the position 20' as shown in dotted lines of FIG. 3. Therefore, the smallest coin b discharged from the discharge end 3' of the coin passage 5 is guided along the inner surface of the guide chute 20 toward the center of the accumulating cylinder 16b, then strikes onto the abutting plate 21 in substantially horizontal orientation at the center of the accumulating cylinder 16b, and finally drops into the accumulating cylinder 16b. Consequently the coins are accumulated in good condition.

What is claimed is:

1. A coin guiding device for use in a coin processing machine of the type in which coins are accumulated into an accumulating cylinder from a coin passage, which device comprises;

a coin passage defined by a fixed guide and a movable guide, said movable guide being moved to vary the width of the coin passage in accordance with the diameter of the coins to be packaged, an accumulating cylinder positioned below the discharge end of the coin passage, the center of the accumulating cylinder being in alignment with the travelling center line of a coin of a certain kind, and a guiding chute mounted between the discharge end of the coin passage and the accumulating cylinder, said guiding chute being operatively associated with the movable guide to guide the coins toward the center of the accumulating cylinder, with the movable guide being provided at the one end thereof with a cam surface, and with the guide chute being pivotably mounted and being varied in orientation by the engaging point of the cam surface and the one side wall of the guide chute.

2. A coin guiding device as set forth in claim 1, in which the movable guide is moved by a coin kind setting dial.

3. A coin guiding device as set forth in claim 1, further including an abutting plate mounted within the guiding chute for preventing the coins from directly striking onto the inner surface of the guiding chute.

* * * * *